(12) United States Patent
Tao et al.

(10) Patent No.: US 11,798,490 B1
(45) Date of Patent: Oct. 24, 2023

(54) GATE DRIVE CIRCUIT, DRIVING METHOD OF GATE DRIVE CIRCUIT, AND DISPLAY PANEL

(71) Applicant: HKC CORPORATION LIMITED, Shenzhen (CN)

(72) Inventors: Zhicheng Tao, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/086,682

(22) Filed: Dec. 22, 2022

(30) Foreign Application Priority Data

Apr. 27, 2022 (CN) .......................... 202210447430.2

(51) Int. Cl.
*G09G 3/3266* (2016.01)
*G09G 3/36* (2006.01)

(52) U.S. Cl.
CPC ......... *G09G 3/3266* (2013.01); *G09G 3/3674* (2013.01); *G09G 2310/0213* (2013.01); *G09G 2310/0221* (2013.01); *G09G 2330/023* (2013.01)

(58) Field of Classification Search
CPC .............. G09G 3/3266; G09G 3/3674; G09G 2310/0213; G09G 2310/0221; G09G 2330/023
See application file for complete search history.

(56) References Cited

U.S. PATENT DOCUMENTS

2018/0075808 A1* 3/2018 Yamashita ........... G09G 3/3266
2019/0164467 A1* 5/2019 Seo ....................... G09G 3/3688

FOREIGN PATENT DOCUMENTS

CN          103680439 A       3/2014

* cited by examiner

*Primary Examiner* — Amare Mengistu
*Assistant Examiner* — Gloryvid Figueroa-Gibson

(57) ABSTRACT

A gate drive circuit, a driving method of the gate drive circuit, and a display panel are disclosed. The gate drive circuit includes a gate start signal selection circuit, at least two gate drive units, and at least two gate start signal lines. The gate driving units drive the at least two display sections in one-to-one correspondence. The gate start signal lines are connected to the gate driving units in one-to-one correspondence. After receiving a gate start signal, the gate start signal selection circuit outputs the gate start signal to the corresponding gate start signal output terminal to drive the corresponding display section.

10 Claims, 3 Drawing Sheets

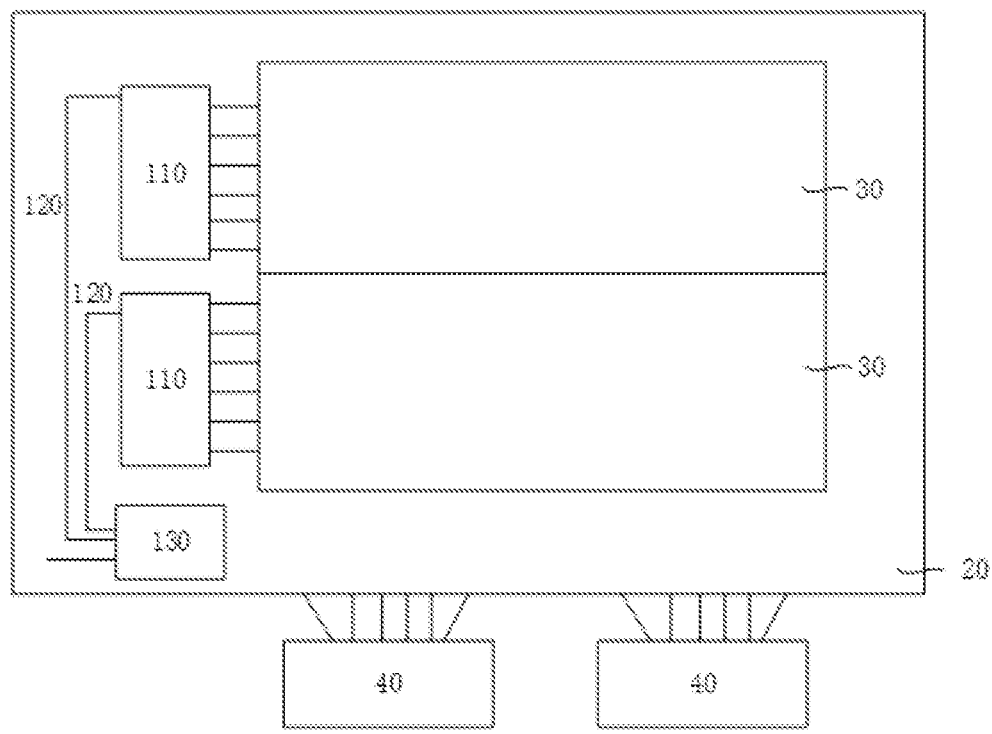

FIG. 4

Receiving a gate start signal by a gate start signal input terminal of a gate start signal selection circuit in a gate drive circuit — S1

Outputting the gate start signal to a corresponding gate start signal output terminal by the gate start signal selection circuit — S2

Receiving the gate start signal by the gate drive unit in the gate drive circuit through the gate start signal line, and driving the corresponding display section — S3

FIG. 5

GATE DRIVE CIRCUIT, DRIVING METHOD OF GATE DRIVE CIRCUIT, AND DISPLAY PANEL

CROSS-REFERENCE TO RELATED APPLICATIONS

This application claims the priority and benefit of Chinese patent application 2022104474302, titled "Gate Drive Circuit, Driving method of Gate Drive Circuit, and Display Panel" and filed Apr. 27, 2022, with China National Intellectual Property Administration, the entire contents of which are incorporated herein by reference.

TECHNICAL FIELD

The present application relates to the field of display technology, and more particularly relates to a gate drive circuit, a driving method of the gate drive circuit, and a display panel.

BACKGROUND

The description provided in this section is intended for the mere purpose of providing background information related to the present application but doesn't necessarily constitute prior art.

Nowadays, display devices have been widely used in various electronic products as a display component of the electronic equipment. Whether it is a liquid crystal display panel (LCD) or an organic light emitting display panel (OLED), a gate drive circuit is required to scan the gates line by line.

In some specific display screens (such as the screen-off clock display function, fingerprint recognition screen, etc.), only a small part of the screen is displayed, and other areas are completely black. If the related method is used to scan the gate lines progressively, power consumption cannot be saved.

SUMMARY

In view of the above, it is a purpose of the present application to provide a gate drive circuit, a driving method of the gate drive circuit, and a display panel, which can save power consumption in some specific display images.

The present application discloses a gate drive circuit for driving scan lines in a display panel. Along the orientation of the data lines in the display panel, the display panel is divided into at least two display sections. The gate drive circuit includes a gate start signal selection circuit, at least two gate drive units, and at least two gate start signal lines. Each of the gate driving units drives the respective display section. The gate start signal lines are connected to the gate driving units in one-to-one correspondence. The gate start signal selection circuit includes a gate start signal input terminal and at least two gate start signal output terminals. The gate start signal input terminal receives a gate start signal. The gate start signal output terminals are connected to the gate start signal lines in one-to-one correspondence, and output the gate start signal. After receiving the gate start signal, the gate start signal selection circuit outputs the gate start signal to the corresponding gate start signal output terminal to drive the corresponding display section.

Optionally, the gate start signal selection circuit includes at least two selection units. One end of each of the selection units is connected to the gate start signal input terminal, and the other ends of the selection units is connected to the gate start signal output terminals in one-to-one correspondence. The selection unit includes at least one first switch and/or at least one second switch. The first switch is an N-type transistor or a P-type transistor, and the second switch is an N-type transistor or a P-type transistor. The first switch receives a first timing signal, and the second switch receives a second timing signal. The gate start signal selection circuit controls the corresponding selection unit to output the gate start signal according to the first timing signal and the second timing signal received by the selection unit.

Optionally, the emitter or collector of the first switch is connected to the gate start signal input terminal. The base of the first switch receives the first timing signal through the first signal line. The collector or emitter of the first switch is connected to the collector or emitter of the second switch. The base of the second switch receives the second timing signal through the second signal line. The emitter or collector of the second switch is connected to the gate start signal output terminal.

Optionally, the first switches in different selection units receive the first timing signal through the same first signal line, and the second switches in different selection units receive the second timing signal through the same second signal line.

Optionally, the gate start signal selection circuit includes a first selection unit, a second selection unit, a third selection unit and a fourth selection unit. The first selection unit is composed of two N-type transistors, and the bases of the two N-type transistors respectively receive the first timing signal and the second timing signal. The second selection unit is composed of an N-type transistor and a P-type transistor, and the N-type transistor and the P-type transistor respectively receive the first timing signal and the second timing signal. The third selection unit is composed of two P-type transistors, and the bases of the two P-type transistors respectively receive the first timing signal and the second timing signal. The fourth selection unit is composed of a P-type transistor and an N-type transistor, and the bases of the P-type transistor and the N-type transistor respectively receive the first timing signal and the second timing signal.

When both the first timing signal and the second timing signal are high-level signals, the gate start signal is output to the corresponding gate driving unit through the first selection unit. When both the first timing signal and the second timing signal are low level signals, the gate start signal is output to the corresponding gate driving unit through the third selection unit. When the first timing signal is a high-level signal and the second timing signal is a low-level signal, the gate start signal is output to the corresponding gate driving unit through the second selection unit. When the first timing signal is a low-level signal and the second timing signal is a high-level signal, the gate start signal is output to the corresponding gate driving unit through the fourth selection unit.

Optionally, along the orientation of the data lines in the display panel, the gate start signal selection circuit is arranged on both sides of the gate driving unit.

Optionally, the gate start signal selection circuit is arranged on a side of the gate driving unit close to the data lines of the display panel receiving the signals.

Optionally, along the orientation of the data lines in the display panel, the output port of the previous gate driving unit connected to the last scan line of the corresponding display section is connected to the input port of the next gate driving unit.

The present application further discloses a driving method of a gate drive circuit, which is used for driving the above-mentioned gate drive circuit, comprising the steps of:

receiving a gate start signal by a gate start signal input terminal of the gate start signal selection circuit in the gate drive circuit;

outputting, by the gate start signal selection circuit, the gate start signal to a corresponding gate start signal output terminal; and receiving the gate start signal by the gate drive unit in the gate drive circuit through the gate start signal line, and driving the corresponding display section.

The present application further discloses a display panel, which includes an array substrate and the above-mentioned gate drive circuit, wherein the gate drive circuit is connected to the scan lines in the array substrate.

In the present application, the ordinary gate drive circuit is divided into at least two gate driving units, and the scan lines in the display panel are driven separately by the at least two gate driving units. In some special cases, such as the screen-off clock display function, the fingerprint recognition screen, etc., only the portion of the image that needs to be displayed can be displayed by combining the gate start signal selection circuit and the gate driving units 110, and for other areas that do not need to be displayed, no scan signal will be transmitted to the scan lines, and there is no need to scan all scan lines in the entire display panel line by line, thereby saving power.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

FIG. 4 is a schematic diagram of a third display panel provided by the present application.

FIG. 5 is a flowchart of a driving method of a gate drive circuit provided by the present application.

Figure 1:
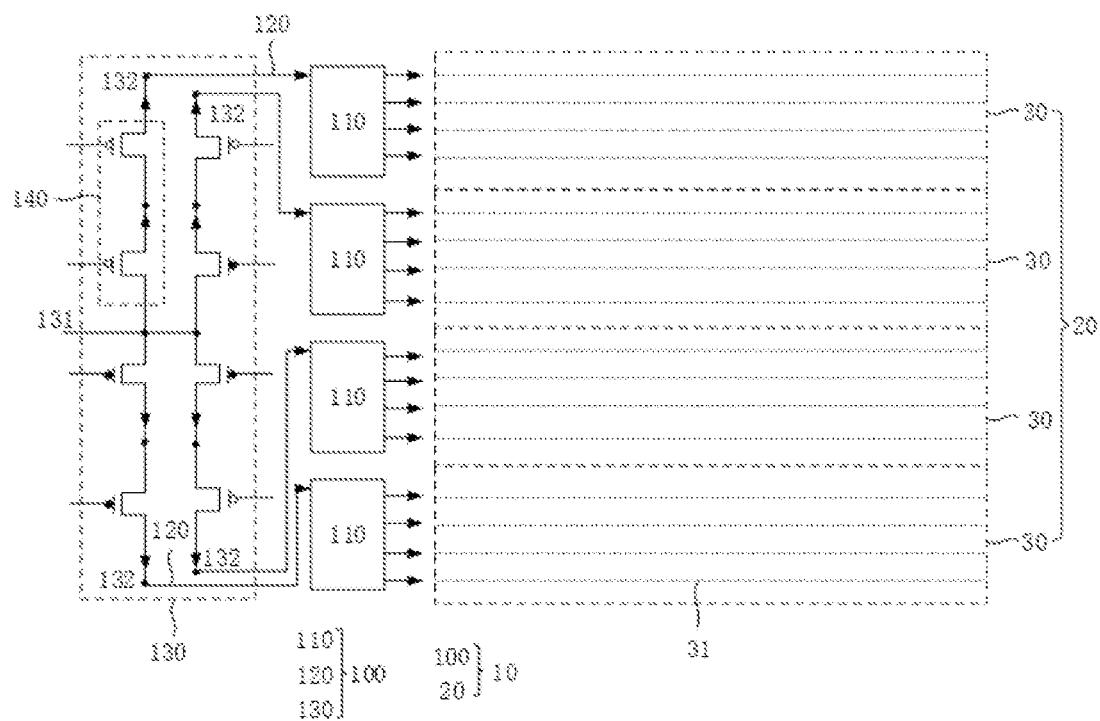
FIG. 1 is a schematic diagram of a first display panel provided by the present application.

In the drawings: 10, display panel; 20, array substrate; 30, display section; 31, scan line; 40, source drive circuit; 100, gate drive circuit; 110, gate drive unit; 120, gate start signal line; 130, gate start signal selection circuit; 131, gate start signal input terminal; 132, gate start signal output terminal; 140, selection unit; 141, first switch; 142, second switch; 143, first selection unit; 144, second selection unit; 145, third selection unit; 146, fourth selection unit.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Hereinafter this application will be described in further detail with reference to the accompanying drawings and some optional embodiments.

As shown in FIG. 1, an embodiment of the present application provides a display panel. The display panel 10 may be an organic light emitting display panel (OLED) or a liquid crystal display panel (LCD). The display panel 10 includes an array substrate 20, a gate drive circuit 100 and a source drive circuit 40. The array substrate 20 is provided with a plurality of scan lines 31 arranged in parallel and a plurality of data lines arranged in parallel. The scan lines 31 and the data lines are arranged perpendicular. The plurality of scan lines 31 and the plurality of data lines enclose a plurality of sub-pixels. The gate drive circuit 100 is located at one end of the scan lines 31, is connected to the scan lines 31, and provides scan signals for the scan lines 31. The source drive circuit 40 is located at one end of the data lines, is connected to the data lines, and provides data signals for the data lines. The gate driver circuit 100 can be formed on the array substrate 20 to form a Gate Driver On Array (GOA) of the array substrate. It can also be disposed outside the array substrate 20 and bonded on the array substrate 20 as an independent chip structure.

In the display panel 10, the display region is divided into at least two display sections 30 along the orientation of the data lines, that is, the scan lines 31 are divided into at least two regions along the orientation of the data lines. Correspondingly, the related gate drive circuit 100 is divided into at least two gate driving units 110, that is, a segmented gate drive circuit 100.

Specifically, the gate drive circuit 100 includes a gate start signal selection circuit 130, at least two gate driving units 110 and at least two gate start signal lines 120. The gate driving units 110 drive the display sections 30 in one-to-one correspondence. The gate start signal lines 120 are connected to the gate driving units 110 in one-to-one correspondence. The gate start signal selection circuit 130 includes a gate start signal input terminal 131 and at least two gate start signal output terminals 132. The gate start signal input terminal 131 receives a gate start signal. The gate start signal output terminals 132 are connected to the gate start signal lines 120 in one-to-one correspondence, and output the gate start signal. After receiving the gate start signal, the gate start signal selection circuit 130 outputs the gate start signal to the corresponding gate start signal output terminal 132 to drive the respective display section 30.

In this embodiment of the present application, the related gate drive circuit is divided into at least two gate driving units 110, and the scan lines 31 in the display panel 10 are driven separately by the at least two gate driving units 110. In some special cases, such as the screen-off clock display function, the fingerprint recognition screen, etc., only the portion of the image that needs to be displayed can be displayed by combining the gate start signal selection circuit 130 and the gate driving units 110, and for other areas that do not need to be displayed, no scan signal will be transmitted to the scan lines 31, and there is no need to scan all scan lines 31 in the entire display panel 10 line by line, thereby realizing segmented control of the display panel 10. For example, in the screen-off clock display function of the display panel 10, under the condition of reducing the refresh rate, only a section of the area is displayed, and the resolution in the orientation of the scan lines 31 is reduced to a fraction of the original, and the data lines transmit data at a fraction of the normal resolution, thus saving power. In addition, the gate drive circuit 100 is improved on the display panel 10. Although some circuit structures are newly added, the cost is basically unchanged, and the yield is not affected.

The adjacent gate driving units 110 may not be connected, so that after receiving the gate start signal, some gate driving units 110 only drive the respective display sections 30 independently, and different gate driving units 110 do not interfere with each other, so that the scan lines 31 in the dark state image are not driven.

For example, the display section 30 may be divided into a first display section 30, a second display section 30, a third display section 30 and a fourth display section 30 along the data line orientation. Correspondingly, the gate drive circuit 100 includes a first gate driving unit 110, a second gate driving unit 110, a third gate driving unit 110 and a fourth gate driving unit 110, which are used to drive the first display section 30, the second display section 30, the third display section 30 and the fourth display section 30 in one-to-one correspondence. If only the second display section 30 is required to display an image, while the first display section 30, the third display section 30 and the fourth display section 30 do not display an image, then the gate start signal selection circuit 130 outputs the gate start signal to the second gate driving unit 110, so that the first row of scan line 31 to the last row of scan line 31 in the second display section 30 are scanned in sequence, while the scan lines in the first display section 30, the third display section 30 and the fourth display section 30 are not scanned, so that the pixels can respond quickly and power consumption can be greatly reduced.

Figure 2:
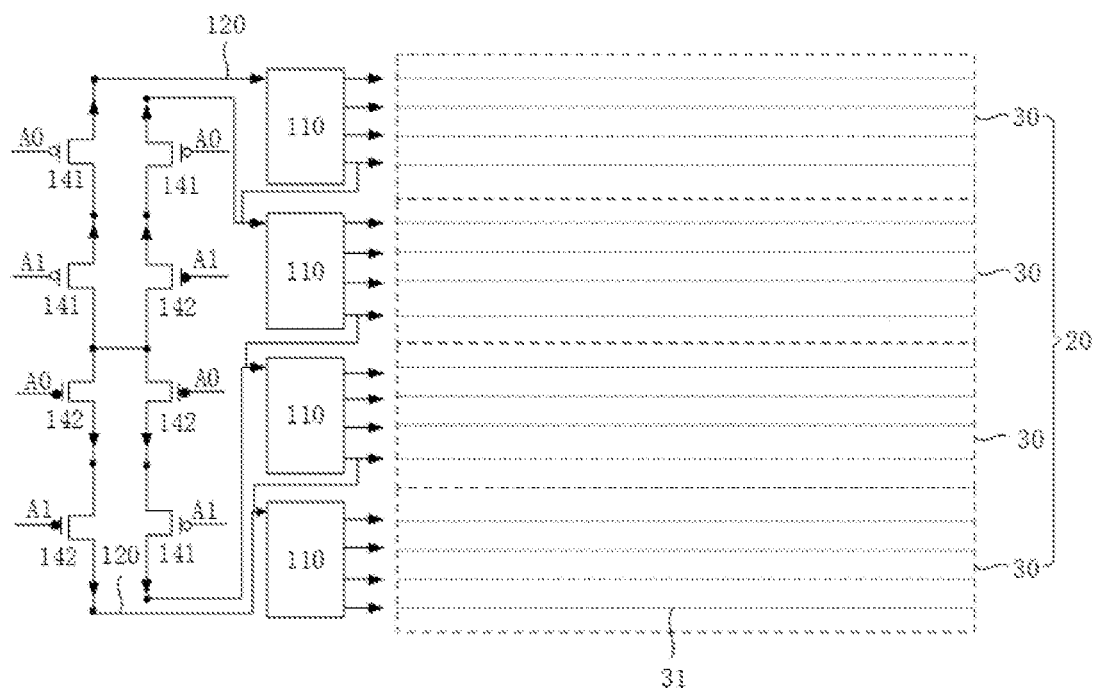
FIG. 2 is a schematic diagram of a second display panel provided by the present application.

Of course, adjacent gate driving units 110 may also be connected to each other. As shown in FIG. 2, at this time, along the data line orientation, the output port of the previous gate driving unit 110 connected to the last scan line 31 of the respective display section 30 is connected to the input port of the next gate driving unit 110.

For example, the display section 30 is divided into a first display section 30, a second display section 30, a third display section 30 and a fourth display section 30 along the data line orientation. Correspondingly, the gate drive circuit 100 includes a first gate driving unit 110, a second gate driving unit 110, a third gate driving unit 110 and a fourth gate driving unit 110, which are used to drive the first display section 30, the second display section 30, the third display section 30 and the fourth display section 30 in one-to-one correspondence.

If only the second display section 30 needs to display an image, while the first display section 30, the third display section 30 and the fourth display section 30 do not display images, then at this time, the gate start signal selection circuit 130 outputs the gate start signal to the second gate driving unit 110, so that the first row of scan line 31 through the last row of scan line 31 in the second display section 30 are scanned in sequence, then the scan lines 31 in the third display section 30 and the fourth display section 30 start to be scanned. Since the first display section 30, the third display section 30 and the fourth display section 30 do not need to display images, the data lines will not transmit display data to the first display section 30, the third display section 30 and the fourth display section 30, so that although the scan lines 31 are scanned, the screen still doesn't display an image. Although this method will increase the power consumption, it can be applied to the case where the display screen is large, the refresh rate of the display panel 10 can also be reduced, and the problem of increased power consumption can also be overcome to a certain extent. If the full screen needs to be displayed, the gate start signal only needs to be output to the first gate driving unit 110 at this time, so that all the scan lines 31 in the display panel 10 are scanned row by row. In this way, the gate drive circuit 100 can be used not only for normal screen display, but also for display of some special screens or images, which can reduce power consumption in a targeted manner.

Figure 3:
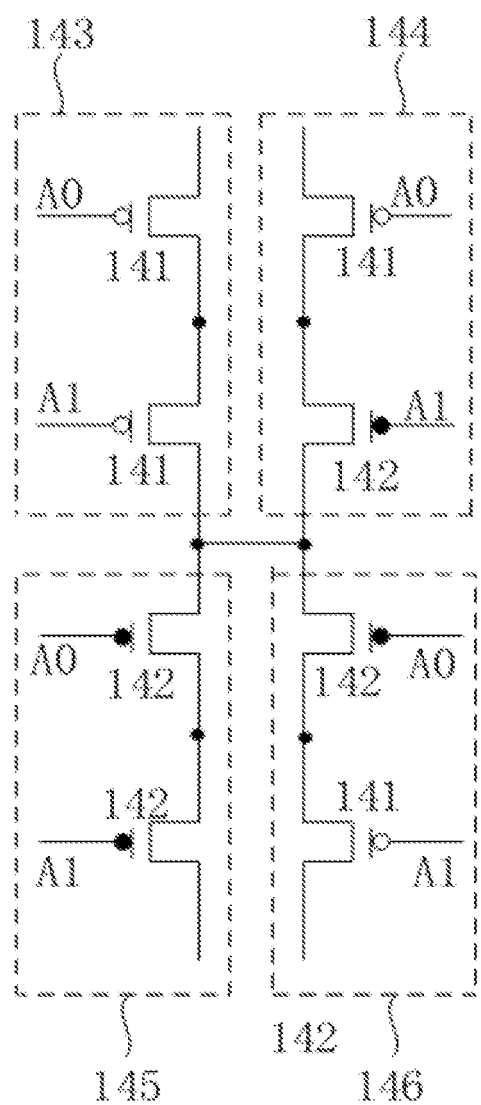
FIG. 3 is a schematic diagram of a gate start signal selection circuit provided by the present application.

As shown in FIG. 1 and FIG. 3, the gate start signal selection circuit 130 includes at least two selection units 140. One end of the selection unit 140 is connected to the gate start signal input terminal 131, and the other end is connected to the gate start signal output terminal 132 in one-to-one correspondence. The selection unit 140 includes at least one first switch 141 and at least one second switch 142. The first switch 141 is an N-type transistor or a P-type transistor, and the second switch 142 is an N-type transistor or a P-type transistor. The first switch 141 receives a first timing signal (A0), and the second switch 142 receives a second timing signal (A1). The gate start signal selection circuit 130 controls the corresponding selection unit 140 to output the gate start signal according to the first timing signal (A0) and the second timing signal (A1) received by the selection unit 140.

In the embodiment of the present application, the selection unit 140 in the gate start signal selection circuit 130 is composed of transistors, and the voltage requirements for turning on different transistors are different. For example, an N-type transistor (NPN) is turned on at high level and turned off at low level. A P-type transistor (PNP) turns on at low level and turns off at high level. The selection conditions of different selection units 140 are different through the arrangement and combination of different transistors. Only when both the first timing signal (A0) and the second timing signal (A1) satisfy the turn-on condition for the transistor, the selection unit 140 will transmit the gate start signal to the corresponding gate driving unit 110. The selection unit 140 in the embodiment of the present application has simple structure design, small occupied space, diverse selection conditions, and accurate judgment conditions for signals, which can be applied to most display images and has broad application prospects.

A transistor may have three terminals, which are the emitter, the collector, and the base. In this embodiment of the present application, the emitter or collector of the first switch 141 is connected to the gate start signal input terminal 131. The base of the first switch 141 receives the first timing signal (A0) through the first signal line. The collector or emitter of the first switch 141 is connected to the collector or emitter of the second switch 142. The base of the second switch 142 receives the second timing signal (A1) through the second signal line. The emitter or collector of the second switch 142 is connected to the gate start signal output terminal 132.

It should be noted that in the embodiments of the present application the number of selection units 140 in the gate start signal selection circuit 130 are not limited. Although the greater the number of selection units 140, the greater the number of gate driving units 110 and the number of display sections 30, it is easier to achieve fine and precise driving, which can further reduce power consumption. However, the structure of the gate start signal selection circuit 130 will also be more complicated, the volume will increase, and it is difficult to achieve narrow borders. Therefore, specific designs can be made depending on actual conditions.

When there are only two gate driving units 110, there may also be only two selection units 140, and the two selection units 140 may each be constituted by only one transistor of a different type. Alternatively, the two selection units 140 may each be composed of two identical or different transistors, as long as the signal transmission can be realized in different situations, and the same principle is also applied to the principle when there are only two gate driving units 110.

When the gate start signal selection circuit 130 has four selection units 140, the four selection units 140 are the first selection unit 143, the second selection unit 144, the third selection unit 145 and the fourth selection unit 146 respectively. The first selection unit 143 is composed of two N-type transistors, and the bases of the two N-type transistors respectively receive the first timing signal (A0) and the second timing signal (A1). The second selection unit 144 is composed of an N-type transistor and a P-type transistor, and the N-type transistor and the P-type transistor respectively receive the first timing signal (A0) and the second timing signal (A1). The third selection unit 145 is composed of two P-type transistors, and the bases of the two P-type transistors respectively receive the first timing signal (A0) and the second timing signal (A1). The fourth selection unit 146 is composed of a P-type transistor and an N-type transistor, and the bases of the P-type transistor and the N-type transistor respectively receive the first timing signal (A0) and the second timing signal (A1). At this time, both the first timing signal (A0) and the second timing signal (A1) are high-level signals or both are low-level signals. Of course, it is also feasible if the first timing signal (A0) and the second timing signal (A1) are signals of different levels, but it will lead to more complicated design.

At this time, when the first timing signal (A0) and the second timing signal (A1) are each at high level, the two N-type transistors in the first selection unit 143 are turned on, and the gate start signal is transmitted to the corresponding gate driving unit 110 through the first selection unit 143. In the second selection unit 144, only one N-type transistor is turned on, and the other P-type transistor is turned off, so the gate start signal cannot pass through the second selection unit 144. In the third selection unit 145, the two P-type transistors are turned off, and the gate start signal cannot pass through the third selection unit 145. In the fourth selection unit 146, only one N-type transistor is turned on, and the other P-type transistor is turned off, and the gate start signal still cannot pass through the fourth selection unit 146. Therefore, after the gate drive circuit 100 receives the gate start signal, the gate start signal is filtered in the gate start signal selection circuit 130, and can only pass through the first selection unit 143. Thus, only the gate driving unit 110 connected to the first selection unit 143 can drive the scan lines 31 in the corresponding display section 30, so that the image is displayed in this area.

When both the first timing signal (A0) and the second timing signal (A1) are high-level signals, the gate start signal is output to the corresponding gate driving unit 110 through the first selection unit 143. When both the first timing signal (A0) and the second timing signal (A1) are low-level signals, the gate start signal is output to the corresponding gate driving unit 110 through the third selection unit 145. When the first timing signal (A0) is a high-level signal and the second timing signal (A1) is a low-level signal, the gate start signal is output to the corresponding gate driving unit 110 through the second selection unit 144. When the first timing signal (A0) is a low-level signal and the second timing signal (A1) is a high-level signal, the gate start signal is output to the corresponding gate driving unit 110 through the fourth selection unit 146.

When the number of selection units 140 in the gate start signal selection circuit 130 exceeds four, the number of transistors can be further increased in each selection unit 140 to increase the number of types of permutations and combinations. Correspondingly, the number of timing signals is also increased, so that the corresponding selection conditions of the selection units 140 are different from each other.

In addition to the selection units 140 of different transistor combination types, the gate start signal selection circuit 130 may also have selection units 140 of the same transistor combination type. That is, in the gate start signal selection circuit 130, the type of the first switch 141 and the type of the second switch 142 in a part of the selection units 140 are different, and in another part of the selection units 140, the type of the first switch 141 and the type of the second switch 142 are identical. In this way, two or more gate driving units 110 can be controlled to drive the scan lines 31 in the respective display sections 30 at the same time, so that the two or more display sections 30 produce images. When a certain special picture only needs to be displayed on the top and bottom of the display panel 10, or only needs to be displayed in the spaced display sections 30, in this way, these pictures can be displayed at the same time without scanning all the scan lines 31, which can not only improve the synchronization rate of the pictures, but also save power consumption.

In a related display device, the driving method is to transmit signals to the gate drive circuit 100 and the source drive circuit 40 through a timing control chip, so as to control the screen display. For the embodiment of the present application, the first timing signal (A0) and the second timing signal (A1) come from the timing control chip. The gate start signal selection circuit 130 is connected to the timing control chip through the first signal line to receive the first timing signal (A0), and connected to the timing control chip through the second signal line to receive the second timing signal (A1). When the number of selection units 140 in the gate start signal selection circuit 130 is relatively large, if each selection unit 140 receives timing signals through two signal lines, the number of signal lines will be too large, and the bezel size will increase. Therefore, in this embodiment of the present application, the first switches 141 in different selection units 140 may receive the first timing signal (A0) through the same first signal line, and the second switches 142 in different selection units 140 may receive the second timing signal (A1) through the same second signal line. Then the same first signal line is connected to a plurality of first switches 141 through a plurality of pins, and the same second signal line is connected to a plurality of second switches 142 through a plurality of pins, so that the number of the first signal lines and the second signal lines is reduced, which is beneficial to reduce the bezel.

As shown in FIG. 4, the embodiment of the present application further discloses the specific position design of the gate drive circuit 100. For the gate driving unit 110, it can be disposed on the display panel 10 to form a plurality of GOA units. For the gate start signal selection circuit 130, it is possible to arrange it at both sides of the GOA unit. That is, along the orientation of the data lines in the display panel 10, the gate start signal selection circuit 130 is disposed on one or two of both sides of the gate driving unit 110. Since there is still some space between the two sides of the GOA unit and the edges of the display panel 10, the gate start signal selection circuit 130 may be arranged at this position to avoid increasing the bezel of the display panel 10.

Further, the gate start signal selection circuit 130 is disposed on the side of the gate driving units 110 close to the data lines receiving the signals. Since along the orientation of the data lines the display panel 10 also needs to be connected to the source drive circuit 40, a large space is reserved. Placing the gate start signal selection circuit 130 in this position can bring more design leeway. Even if the number of selection units 140 in the gate start signal selection circuit 130 is large so that the area occupied by the gate start signal selection circuit 130 is large, it can still meet the requirements.

Correspondingly, as shown in FIG. 5, the present application further discloses a driving method of a gate drive circuit, which is used for driving the above-mentioned gate drive circuit, and specifically includes the steps:

S1: the gate start signal input terminal of the gate start signal selection circuit in the gate drive circuit receives a gate start signal;

S2: the gate start signal selection circuit outputs the gate start signal to the corresponding gate start signal output terminal;

S3: the gate driving unit in the gate drive circuit receives the gate start signal through the gate start signal line, and drives the corresponding display section.

Through the above driving method, the gate driving units separately drive the scan lines in the display panel. In some special cases, such as the screen-off clock display function, the fingerprint recognition screen, etc., it is not needed to scan all the scan lines in the entire display panel line by line, thereby saving power consumption.

It should be noted that the limitations of various operations involved in this solution will not be deemed to limit the order of the operations, provided that they do not affect the implementation of the specific solution, so that the operations written earlier may be executed earlier or they may also be executed later or even at the same time. As long as the solution can be implemented, they should all be regarded as falling in the scope of protection of this application.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A gate drive circuit for driving scan lines in a display panel, the display panel being divided into at least two display sections along an orientation of a data line in the display panel, wherein the gate drive circuit comprises:
at least two gate driving units, each of which being is configured to drive the respective display section;
at least two gate start signal lines, connected to the at least two gate driving units in one-to-one correspondence; and
a gate start signal selection circuit, comprising a gate start signal input terminal and at least two gate start signal output terminals; wherein the gate start signal input terminal is configured to receive a gate start signal, and the at least two gate start signal output terminals are connected to the at least two gate start signal lines in one-to-one correspondence and are configured to output the gate start signal; wherein in response to receiving the gate start signal, the gate start signal selection circuit is configured to output the gate start signal to at least one corresponding gate start signal output terminal to drive the at least one corresponding display section;
wherein the gate start signal selection circuit comprises at least two selection units, wherein one end of each of the at least two selection units is connected to the gate start signal input terminal, and wherein another end of each of the at least two selection units is connected to the respective gate start signal output terminal in one-to-one correspondence;
wherein each of the at least two selection units comprises at least one first switch and at least one second switch, wherein the first switch is an N-type transistor or a P-type transistor, the second switch is an N-type transistor or a P-type transistor, wherein the first switch is operative to receive a first timing signal, and the second switch is operative to receive a second timing signal;
wherein the gate start signal selection circuit is configured to control the corresponding selection unit to output the gate start signal depending on the first timing signal and the second timing signal received by each of the at least two selection units;
wherein an emitter or collector of the first switch is connected to the gate start signal input terminal;
a base of the first switch is operative to receive the first timing signal through a first signal line;
a collector or emitter of the first switch is connected to a collector or emitter of the second switch;
a base of the second switch is operative to receive the second timing signal through a second signal line; and
an emitter or collector of the second switch is connected to the respective gate start signal output terminal,
wherein the first switches in different selection units are operative to receive the first timing signal through a same first signal line, and wherein the second switches in different selection units are operative to receive the second timing signal through a same second signal line.

2. The gate drive circuit of claim 1, wherein in the gate start signal selection circuit, a type of the first switch is different than a type of the second switch in a part of the at least two selection units, and wherein a type of the first switch is identical with a type of the second switch in a remaining part of the at least two selection units.

3. The gate drive circuit of claim 1, wherein the gate start signal selection circuit comprises a first selection unit, a second selection unit, a third selection unit, and a fourth selection unit; the first selection unit is comprised of two N-type transistors, and the bases of the two N-type transistors are operative to respectively receive the first timing signal and the second timing signal; the second selection unit is comprised of an N-type transistor and a P-type transistor, and the N-type transistor and the P-type transistor are operative to respectively receive the first timing signal and the second timing signal; the third selection unit is comprised of two P-type transistors, and the bases of the two P-type transistors are operative to respectively receive the first timing signal and the second timing signal; and the fourth selection unit is comprised of a P-type transistor and an N-type transistor, and the bases of the P-type transistor and the N-type transistor are operative to respectively receive the first timing signal and the second timing signal;

wherein in response to both the first timing signal and the second timing signal being high-level signals, the gate start signal is output to the corresponding gate driving unit through the first selection unit;

in response to both the first timing signal and the second timing signal being low-level signals, the gate start signal is output to the corresponding gate driving unit through the third selection unit;

in response to the first timing signal being a high-level signal and the second timing signal being a low-level signal, the gate start signal is output to the corresponding gate driving unit through the second selection unit;

in response to the first timing signal being a low-level signal and the second timing signal being a high-level signal, the gate start signal is output to the corresponding gate driving unit through the fourth selection unit.

4. The gate drive circuit of claim 1, wherein along the orientation of the data line in the display panel, the gate start signal selection circuit is disposed on a side of the at least two gate driving units.

5. The gate drive circuit of claim 4, wherein the gate start signal selection circuit is disposed on a side of the at least two gate driving units adjacent to a signal receiving end of the data line of the display panel.

6. The gate drive circuit of claim 1, wherein along the orientation of the data line in the display panel, an output port of a previous gate driving unit connected to a last scan line of the corresponding display section is connected to an input port of a next gate driving unit.

7. The gate driving circuit of claim 1, wherein adjacent gate driving units are not connected.

8. A driving method of a gate drive circuit, for driving a gate drive circuit for driving scan lines in a display panel, the display panel being divided into at least two display sections along an orientation of a data line in the display panel, wherein the gate drive circuit comprises: at least two gate driving units, each of which being configured to drive the respective display section; at least two gate start signal lines, connected to the at least two gate driving units in one-to-one correspondence; and a gate start signal selection circuit, comprising a gate start signal input terminal and at least two gate start signal output terminals; wherein the gate start signal input terminal is configured to receive a gate start signal, and the at least two gate start signal output terminals are connected to the at least two gate start signals in one-to-one correspondence and are configured to output the gate start signal; wherein the driving method comprising:

receiving the gate start signal by the gate start signal input terminal of the gate start signal selection circuit in the gate drive circuit;

outputting the gate start signal to a corresponding gate start signal output terminal by the gate start signal selection circuit; and receiving the gate start signal by the gate drive unit in the gate drive circuit through the gate start signal line, and driving the corresponding display section;

wherein the gate start signal selection circuit comprises at least two selection units, wherein one end of each of the at least two selection units is connected to the gate start signal input terminal, and wherein another end of each of the at least two selection units is connected to the respective gate start signal output terminal in one-to-one correspondence;

wherein each of the at least two selection units comprises at least one first switch and at least one second switch, wherein the first switch is an N-type transistor or a P-type transistor, the second switch is an N-type transistor or a P-type transistor, wherein the first switch is operative to receive a first timing signal, and the second switch is operative to receive a second timing signal;

wherein the gate start signal selection circuit is configured to control the corresponding selection unit to output the gate start signal depending on the first timing signal and the second timing signal received by each of the at least two selection units;

wherein an emitter or collector of the first switch is connected to the gate start signal input terminal;

a base of the first switch is operative to receive the first timing signal through a first signal line;

a collector or emitter of the first switch is connected to a collector or emitter of the second switch;

a base of the second switch is operative to receive the second timing signal through a second signal line; and an emitter or collector of the second switch is connected to the respective gate start signal output terminal, wherein the first switches in different selection units are operative to receive the first timing signal through a same first signal line, and wherein the second switches in different selection units are operative to receive the second timing signal through a same second signal line.

9. A display panel, comprising an array substrate and a gate drive circuit, wherein the gate drive circuit is connected to a scan line in the array substrate, the display panel being divided into at least two display sections along an orientation of a data line in the display panel, and wherein the gate drive circuit comprises:

at least two gate driving units, each of which being is configured to drive the respective display section;

at least two gate start signal lines, connected to the at least two gate driving units in one-to-one correspondence; and a gate start signal selection circuit, comprising a gate start signal input terminal and at least two gate start signal output terminals; wherein the gate start signal input terminal is configured to receive a gate start signal, and the at least two gate start signal output terminals are connected to the at least two gate start signal lines in one-to-one correspondence and are configured to output the gate start signal;

wherein in response to receiving the gate start signal, the gate start signal selection circuit is configured to output the gate start signal to at least one corresponding gate start signal output terminal to drive the at least one corresponding display section wherein the gate start signal selection circuit comprises a plurality of selection units, wherein one end of each of the plurality of selection units is connected to the gate start signal input terminal, and another end of each of the plurality of selection units is connected to the respective gate start signal output terminal in one-to-one correspondence;

wherein each of the plurality of selection units comprises at least one first switch and at least one second switch, wherein the first switch is an N-type transistor or a P-type transistor, the second switch is an N-type transistor or a P-type transistor, wherein the first switch is operative to receive a first timing signal, and the second switch is operative to receive a second timing signal; wherein the gate start signal selection circuit comprises a first selection unit, a second selection unit, a third selection unit, and a fourth selection unit; the first selection unit is comprised of two N-type transistors, and the bases of the two N-type transistors are operative to respectively receive the first timing signal and the second timing signal; the second selection unit is comprised of an N-type transistor and a P-type transistor, and the N-type transistor and the P-type transistor are operative to respectively receive the first timing signal and the second timing signal; the third selection unit is comprised of two P-type transistors, and the bases of the two P-type transistors are operative to respectively receive the first timing signal and the second timing signal; and the fourth selection unit is comprised of a P-type transistor and an N-type transistor, and the bases of the P-type transistor and the N-type transistor are operative to respectively receive the first timing signal and the second timing signal, wherein in response to both the first timing signal and the second timing signal being high-level signals, the gate start signal is output to the corresponding gate driving unit through the first selection unit, in response to both the first timing signal and the second timing signal being low-level signals, the gate start signal is output to the corresponding gate driving unit through the third selection unit;

in response to the first timing signal being a high-level signal and the second timing signal being a low-level signal, the gate start signal is output to the corresponding gate driving unit through the second selection unit;

in response to the first timing signal being a low-level signal and the second timing signal being a high-level signal, the gate start signal is output to the corresponding gate driving unit through the fourth selection unit.

10. The display panel of claim 9, wherein the gate drive circuit is arranged on the display panel.

* * * * *